Feb. 7, 1928.
A. A. ANDERSON
AIRCRAFT LANDING GEAR
Filed Feb. 3, 1927
Fig.1,
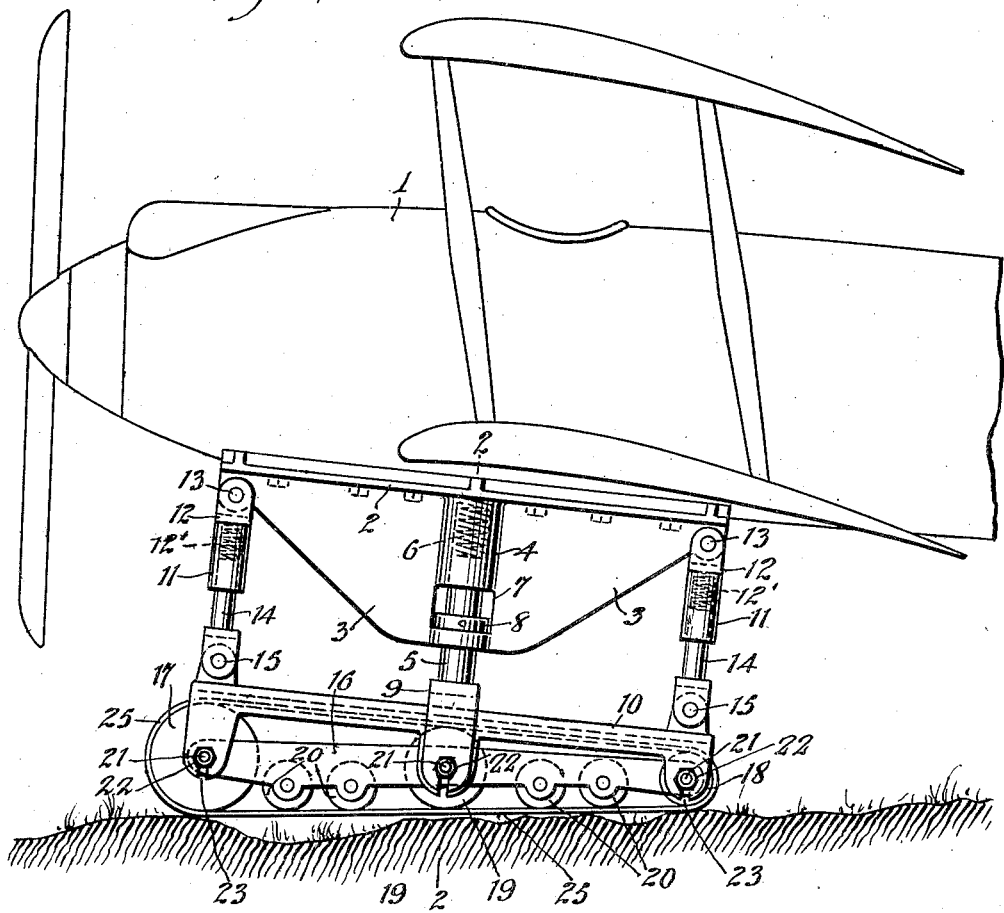
Fig.2.
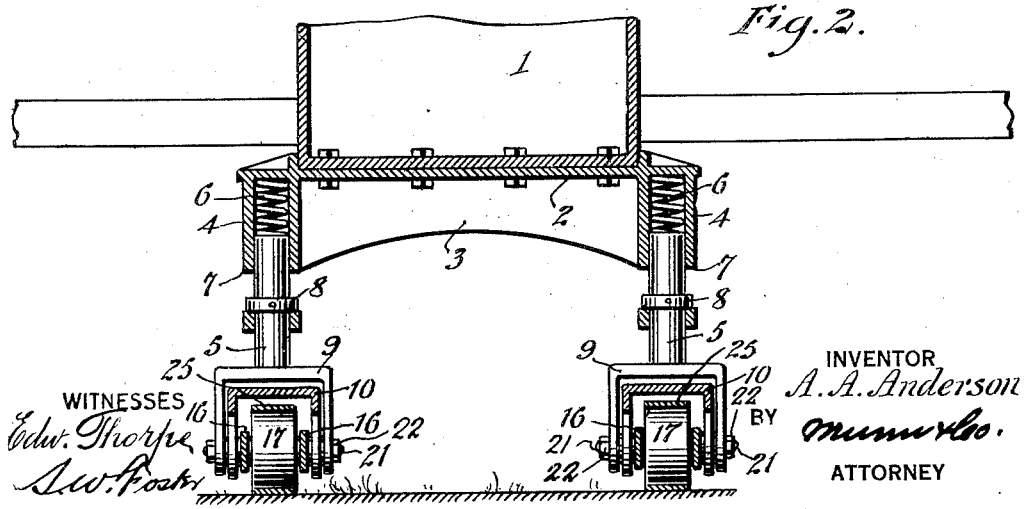
WITNESSES
Edw. Thorpe
S. W. Foster
INVENTOR
A. A. Anderson
BY
Munn & Co.
ATTORNEY Patented Feb. 7, 1928.

1,658,700

UNITED STATES PATENT OFFICE.

ABRAM A. ANDERSON, OF NEW YORK, N. Y.

AIRCRAFT LANDING GEAR.

Application filed February 3, 1927. Serial No. 165,641.

This invention relates to aircraft landing gears, an object of the invention being to provide a landing gear which consists of an endless tractor element or elements movably and resiliently connected to the forward portion of the fuselage of an aircraft and adapted to contact with the ground and ride over the uneven surfaces reducing shock and jar to the aircraft to a minimum.

A further object is to provide a landing gear which includes a plurality of endless ground-engaging tractor elements, roller-mounted and pivotally and resiliently connected to the fuselage of the aircraft to compensate for the varying positions of the landing gear in accordance with the irregularities of the ground.

A further object is to provide a landing gear of this type in which the endless tractor element or elements constitute removable or separable units to permit the endless ground-engaging belt to be removed and replaced at will.

With these and other objects in view the invention consists in certain novel features of construction and combinations and arrangements of parts, which will be more fully hereinafter described and pointed out in the claims.

In the accompanying drawings—

Figure 1 is a view in side elevation illustrating my improved landing gear connected to the fuselage of an air craft;

Figure 2 is a view in transverse section on the line 2—2 of Figure 1.

1 represents the fuselage of an aircraft, to the bottom of which I secure a block 2 having longitudinal and transverse strengthening webs 3. This block 2 is provided at its center and at opposite sides with cylindrical housings 4, 4 in which posts 5 are freely movable. Coil springs 6 are located in the housings 4 and press against the top of the posts 5 offering a cushioned resistance to the vertical movement of the posts. The housings 4 are cut away adjacent their lower portions, as indicated at 7, to accommodate rings 8 secured on the posts 5, and these rings 8 define the vertical movement of the posts and prevent the posts from falling out of the housings.

The lower ends of the posts 5 are forked, as indicated at 9, and straddle the central portions of longitudinally disposed inverted channel bars 10. The front and rear ends of the channel bars 10 are connected to the block 2 by telescoping links 11. These telescoping links 11 comprise housings 12 pivotally connected to the block 2, as indicated at 13, and receiving rods 14 therein which are pivotally connected to the ends of the channel bars 10, as indicated at 15. Coil springs 12' are confined in the housings 12 and tend to force the members of the links apart and offer cushioned resistance to the contraction of the links, as will be readily understood.

My improved ground-engaging members each include a pair of links 16 which support end rollers 17 and 18, a central roller 19 and a plurality of intermediate rollers 20. The rollers 20 may constitute a permanent assemblage in combination with links 16 but the rollers 17, 18 and 19 are removably mounted on bolts 21, and these bolts are extended so that they may be moved into notches or slots 23 in the channel members 10 and also in the fork 9, and are secured in place by clamping nuts 24.

Endless belts 25 are located around the rollers 17, 18, 19 and 20 and constitute ground-engaging elements, and it will be noted that by reason of the construction above described the links 16 with the assemblage of rollers therein can be removed from the channel bars 10 and the belts 25 slipped off of the same laterally and new belts inserted whenever occasion may require.

In constructing the landing gear it is advisable to have the front rollers 17 larger than the other rollers so as to give a general incline to the landing gear as a whole and to cause the endless members to more efficiently ride over uneven places on the ground.

The invention is of course not limited to the relative sizes and proportions of the several rollers nor to the general shape in side elevation of the endless tractor or ground-engaging device as a whole but I desire to cover broadly the idea of a landing gear which includes an endless belt or tractor element as distinguished from a wheel or the like, which provides an extended bearing on the ground, and which is capable of movement sufficient to compensate for varying positions of the ground-engaging members to cushion the shocks and jars of contact with the ground and to allow the ground-engaging members to take any angle within reason which may be necessary for proper landing.

A landing gear of this type lends itself to braking action so as to offer the desired resistance to the forward momentum of the aircraft in landing, and it is altogether within the scope of the invention to employ braking means either in combination with the tractor elements or independently thereof.

While I have illustrated one embodiment of my invention, it is obvious that various changes and alterations might be made in the general form of the parts described without departing from my invention and hence I do not limit myself to the precise details set forth but consider myself at liberty to make such changes and alterations as fairly fall within he spirit and scope of the appended claims.

I claim:

1. The combination with a fuselage, of a block fixed to the fuselage, a pair of inverted channel members, posts pivotally connected to intermediate portions of the channel members and having cushioned mounting in the block, cushioned links at the respective ends of the channel members, and removable ground-engaging flexible tractor elements mounted in said channel members.

2. The combination with a fuselage, of a block fixed to the fuselage, a pair of inverted channel members, posts pivotally connected to intermediate portions of the channel members and having cushioned mounting in the block, cushioned links at the respective ends of the channel members, roller assemblages removably mounted in the channel members, and endless belts on the rollers, said endless belts capable of removal from the rollers when the roller assemblages are removed from the channel members.

ABRAM A. ANDERSON.